United States Patent
Park et al.

(10) Patent No.: US 10,793,747 B2
(45) Date of Patent: Oct. 6, 2020

(54) HARD COATING COMPOSITION AND FLEXIBLE DISPLAY DEVICE INCLUDING THE HARD COATING COMPOSITION

(71) Applicant: SAMSUNG DISPLAY CO., LTD., Yongin-si, Gyeonggi-do (KR)

(72) Inventors: Young-Sang Park, Seoul (KR); Ah-Ram Lee, Cheonan-si (KR); So-Yeon Han, Hwaseong-si (KR); In-Seo Kee, Asan-si (KR); Chul-Ho Jeong, Seoul (KR); Tae-Hyeog Jung, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 169 days.

(21) Appl. No.: 15/647,729

(22) Filed: Jul. 12, 2017

(65) Prior Publication Data

US 2018/0142127 A1 May 24, 2018

(30) Foreign Application Priority Data

Nov. 24, 2016 (KR) ........................ 10-2016-0157752

(51) Int. Cl.
| | | |
|---|---|---|
| *C09D 183/06* | (2006.01) | |
| *C08G 59/32* | (2006.01) | |
| *C08G 59/20* | (2006.01) | |
| *C08G 59/22* | (2006.01) | |
| *C08G 65/22* | (2006.01) | |
| *C08K 5/00* | (2006.01) | |
| *C08G 77/14* | (2006.01) | |

(52) U.S. Cl.
CPC ........... *C09D 183/06* (2013.01); *C08G 59/20* (2013.01); *C08G 59/22* (2013.01); *C08G 59/3281* (2013.01); *C08G 65/22* (2013.01); *C08G 77/14* (2013.01); *C08K 5/0025* (2013.01)

(58) Field of Classification Search
CPC .. C09D 183/06; C08G 65/22; C08G 59/3281; C08G 59/22; C08G 59/20; C08G 77/14; C08K 5/0025
See application file for complete search history.

(56) References Cited

U.S. PATENT DOCUMENTS

| | | | |
|---|---|---|---|
| 8,929,085 B2 | 1/2015 | Franklin et al. | |
| 9,069,521 B2 | 6/2015 | Lee et al. | |
| 2007/0135589 A1* | 6/2007 | DeRudder | C08L 69/00 525/464 |
| 2014/0065326 A1* | 3/2014 | Lee | G06F 1/16 428/12 |
| 2015/0132520 A1* | 5/2015 | Han | B32B 37/12 428/38 |
| 2016/0046830 A1* | 2/2016 | Kim | C09D 183/06 428/412 |

* cited by examiner

*Primary Examiner* — Robert S Jones
(74) *Attorney, Agent, or Firm* — F. Chau & Associates, LLC

(57) ABSTRACT

A coating composition includes a siloxane oligomer including an epoxy group and acryl group, a cross-linker, a polymerization initiator and a solvent.

16 Claims, 5 Drawing Sheets

HARD COATING COMPOSITION AND FLEXIBLE DISPLAY DEVICE INCLUDING THE HARD COATING COMPOSITION

CROSS-REFERENCE TO RELATED APPLICATION

This application claims priority under 35 USC § 119 to Korean Patent Application No. 10-2016-0157752, filed on Nov. 24, 2016 in the Korean Intellectual Property Office (KIPO), the disclosure of which is incorporated by reference herein in its entirety.

1. TECHNICAL FIELD

Exemplary embodiments of the present invention relate to a coating composition, and more particularly, to a hard coating composition and a flexible display device including a hard coating layer.

2. DISCUSSION OF RELATED ART

A mobile device such as a communication terminal, a multi-media device, a portable computer, or a photographing device may include a display device to display an image.

A plastic film (e.g., a plastic substrate) may be used as a window of a display device, which may result in a relatively low weight and/or a relatively flexible display device.

A plastic film may have a relatively lower hardness than a glass substrate. Thus, a hard coating layer may be included in a display device including the plastic film to increase durability (e.g., hardness) of the display device.

SUMMARY

An exemplary embodiment of the present invention provides a hard coating composition capable of forming a hard coating layer that has a flexibility to implement a flexibly display device, and has a relatively high abrasion resistance and a relatively high scuff resistance.

An exemplary embodiment of the present invention provides a flexible display device having relatively high flexibility, relatively high abrasion resistance and a relatively high scuff resistance.

According to an exemplary embodiment, a coating composition includes a siloxane oligomer including an epoxy group and acryl group, a cross-linker, a polymerization initiator and a solvent.

In an exemplary embodiment, the siloxane oligomer includes a silsesquioxane compound including repeating units represented by Chemical Formula 1. An oxygen atom connected to * is connected to an adjacent Si atom in the siloxane oligomer. R1 represents an epoxy group or an alkyl group including an epoxy group. R2 represents a (meth) acryl group or an alkyl group including a (meth)acryl group. n and m independently represent a natural number. A summation of n and m is from 6 to 100.

<Chemical Formula 1>

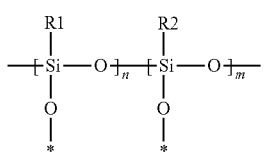

In an exemplary embodiment, a male ratio of a first repeating unit, which is connected to R1, to a second repeating group, which is connected to R2, is from 80:20 to 60:40.

In an exemplary embodiment, the siloxane oligomer includes a silsesquioxane compound including repeating units represented by Chemical Formula 5. An oxygen atom connected to * is connected to an adjacent Si atom in the siloxane oligomer. R1 represents an epoxy group or an alkyl group including an epoxy group. R2 represents a (meth) acryl group or an alkyl group including a (meth)acryl group. R3 represents a fluoroalkyl group, in which at least one hydrogen atom is substituted with a fluorine atom, or a perfluoro polyether group. n, m and r independently represent a natural number. A summation of n, m and r is from 6 to 100.

<Chemical Formula 5>

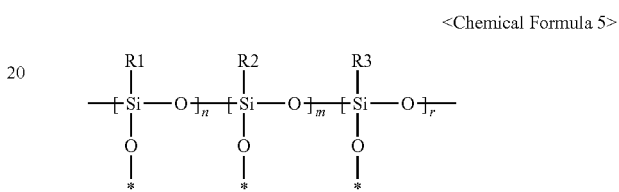

According to an exemplary embodiment, a display device includes a display panel, and a window member positioned on at least a surface of the display panel and including a coating layer. The coating layer includes a cross-linked structure of a silsesquioxane compound. The coating layer has an indentation hardness of about 4.0 GPa or less and a tensile modulus of about 50 MPa or more.

According to exemplary embodiments, flexibility and indentation, hardness of a hard coating layer may be increased, which may increase resistance against external scuffing and abrasion. The hard coating layer may increase durability, bending allowance and reliability of a flexible display device. Thus, an out-folding flexible display device as well as in-out-folding flexible display device may be implemented.

BRIEF DESCRIPTION OF THE DRAWINGS

A more complete appreciation of the present invention will become more apparent by describing in detail exemplary embodiments thereof with reference to the accompanying drawings, in which.

DETAILED DESCRIPTION OF THE EMBODIMENTS

Figure 1:
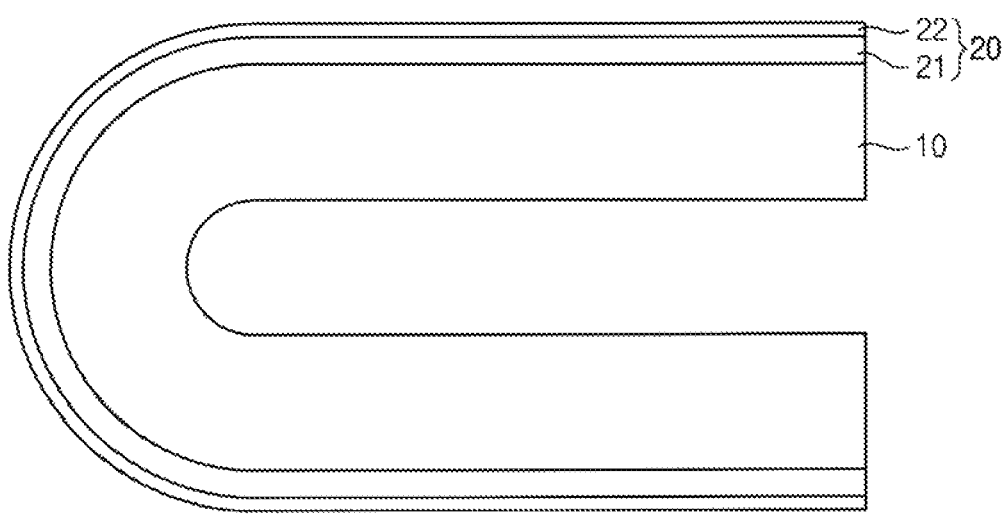
FIG. 1 is a cross-sectional view illustrating a flexible display device according to an exemplary embodiment of the present invention.

Exemplary embodiments of the present invention will be described in more detail below with reference to the accompanying drawings, in which exemplary embodiments are illustrated. Exemplary embodiments of the present invention may, however, be embodied in many different forms and should not be construed as limited to the embodiments set forth herein. Like reference numerals may refer to like elements throughout the specification and drawings.

Hard Coating Composition

A hard coating composition according to an exemplary embodiment of the present invention may include a siloxane oligomer, a cross-linker, a polymerization initiator and a remainder of the hard coating composition may be a solvent. For example, the hard coating composition may include a siloxane oligomer including an epoxy group and an acryl group, a cross-linker, a polymerization initiator and a remainder of the hard coating composition may be a solvent.

As an example, the siloxane oligomer may be a silsesquioxane compound including an epoxy group and an acryl group and having a 3-dimensional network structure.

As an example, the siloxane oligomer may include repeating units represented by the following Chemical Formula 1.

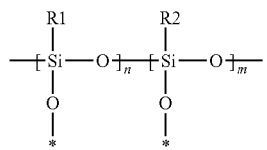

<Chemical Formula 1>

In Chemical Formula 1, an oxygen atom connected to * is connected to another Si atom in the siloxane oligomer, R1 represents an epoxy group or an alkyl group including an epoxy group, R2 represents a (meth)acryl group or an alkyl group including a (meth)acryl group, n and m independently represent a natural number, and a summation of n and m is 6 to 100. Each of the alkyl groups may have a straight shape, a branched shape, a ring shape or a combination of thereof.

As an example, R1 may represent an alkyl group including an epoxy group and having a carbon number of 1 to 40. R2 may represent an alkyl group of which an end is combined with a (meth)acryl group, the alkyl group having a carbon number of 1 to 10.

For example, R1 may be represented by the following Chemical Formulas 2-1 or 2-2.

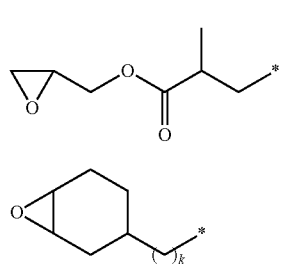

<Chemical Formula 2-1>

<Chemical Formula 2-2>

In Chemical Formula 2-2, k may represent a natural number of 1 to 10.

For example, R2 may be represented by the following Chemical Formulas 3-1 or 3-2.

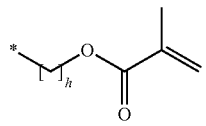

<Chemical Formula 3-1>

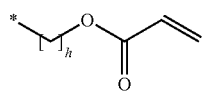

<Chemical Formula 3-1>

In Chemical Formulas 3-1 and 3-2, h may represent an integer. For example, h may represent an integer of 0 to 10. When h is at least 1, at least one methylene group may be substituted with —O—, —CH=CH—, —(C=O)— or —O(C=O)—.

For example, the siloxane oligomer may be represented by the following Chemical Formula 1-1.

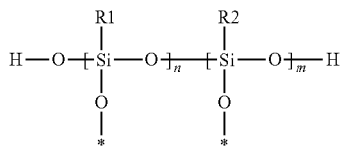

<Chemical Formula 1-I>

As an example, an average molecular weight of the siloxane oligomer may be 5,000 to 10,000. When the average molecular weight of the siloxane oligomer is less than 5,000, an indentation hardness of a coating layer including the hard coating composition may be reduced. When the average molecular weight of the siloxane oligomer is more than 10,000, the the siloxane oligomer may form a gel.

As an example, the siloxane oligomer may be obtained by reaction of a silane compound including an epoxy group and a silane compound including an acryl group. For example, the silane compound including an epoxy group and the silane compound including an acryl group may react with each other in the presence of a basic catalyst such as $Ba(OH)_2 \cdot H_2O$ to form the siloxane oligomer. The molecular weight of the siloxane oligomer may be controlled by reaction time.

In an exemplary embodiment of the present invention, the siloxane oligomer may include an epoxy-containing group and an acryl-containing group. Thus, the coating layer formed from the hard coating composition may have flexibility as well as increased hardness.

For example, the mole ratio of the epoxy-containing group, which is the repeating unit connected to R1, to the acryl-containing group, which is the repeating unit connected to R2, may be 90:10 to 50:50. For example, the mole ratio of the epoxy-containing group, which is the repeating unit connected to R1, to the acryl-containing group, which is the repeating unit connected to R2, may be 80:20 to 50:50. For example, the mole ratio of the epoxy-containing group, which is the repeating unit connected to R1, to the acryl-containing group, which is the repeating unit connected to R2, may be 80:20 to 60:40. A coating layer having the above mole ratios may be flexible and may have a relatively high resistance against external scuffing even without additional anti-abrasion treatment such as forming an anti-smudge layer.

The cross-linker may include an epoxy cross-linker or an acrylate cross-linker. For example, the cross-linker may include an epoxy cross-linker. The epoxy cross-linker may include an epoxy group and may react with the siloxane oligomer to form a network structure. For example, an ether bond (—O—) may be formed through ring-opening and reaction of the epoxy groups of the epoxy cross-linker and the siloxane oligomer. As an example, when the siloxane oligomer includes a hydroxyl group, the hydroxyl group may react to form an ether bond (—O—).

As an example, the epoxy cross-linker may include at least two epoxy groups. For example, the epoxy cross-linker may include 4-vinylcyclohexene dioxide, cyclohexene vinyl monoxide, (3,4-epoxycyclohexane)methyl 3,4-epoxycyclohexane carboxylate, 3,4-epoxycyclohexylmethyl methacrylate, bis(3,4-epoxycyclohexylmethyl)adiphate, 3,4-epoxycyclohexane carboxylate, or 2-(3,4-epoxycyclohexyl)-1,3-dioxolane. These may be used each alone or in a combination thereof.

For example, the siloxane oligomer represented by Chemical Formula 1-1, in which R1 is represented by Chemical Formula 2-2, and (3,4-epoxycyclohexane)methyl 3,4-epoxycyclohexane carboxylate may react with each other to form a structure represented by the following Chemical Formula 4.

<Chemical Formula 4>

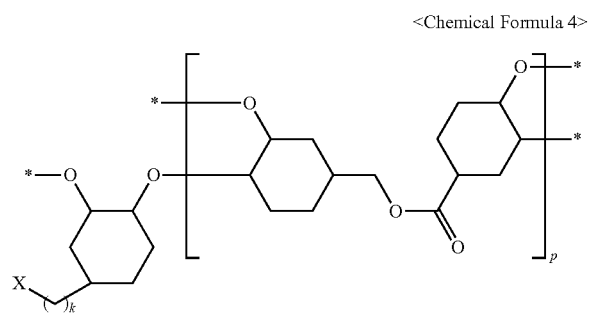

In Chemical Formula 4, p is a natural number of 1 to 20, k is a natural number of 1 to 10, and X is a remainder of Chemical Formula 1-1 excluding R1. For example, X may be a repeating unit represented by the following Chemical Formula 1-2, wherein "*$^1$" is a bonding site.

<Chemical Formula 1-2>

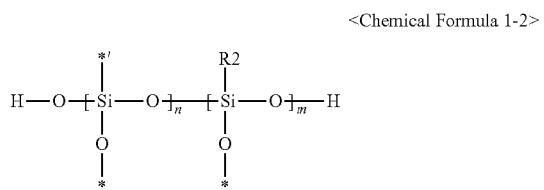

As an example, the polymerization initiator may be a photopolymerization initiator that may generate a photo acid in response to light exposure. For example, the polymerization initiator may include at least one of a radical type initiator and a cationic type initiator.

For example, the radical type initiator may include an oxime ester initiator, an acetophenone initiator, or an acyl phosphine oxide initiator.

For example, the acetophenone initiator may include 2-methyl-1-[(4-methylthio)phenyl]-2-(4-morpholinyl)-1-popanol, 2-benzyl-2-(dimethylamino)-4-morpholinonutyrophenone, 2-(4-methylbenzyl)-2-(dimethylamino)-1-(4-morpholinophenyl)butane-1-one or the like. The acyl phosphine oxide initiator may include 2,4,6-trimethylbenzoyl diphenyl phosphine oxide, bis-2,4,6-trimethylbenzoyl phenyl phosphine oxide, or bis-2,4,4,-trimethylbenzyl phophine oxide. These may each be used alone or in a combination thereof.

For example, the cationic type initiator may include aryl sulfonium hexafluoroantimonate, aryliodonium hexafluoroantimonate, aryl sulfonium hexafluorophosphate, diphenyliodonium hexafluoroantimonate, diphenyliodonium hexafluorophosphate, or ditolyliodonium hexafluorophosphate. These may each be used alone or in a combination thereof.

As an example, the polymerization initiator may include both of the radical type initiator and the cationic type initiator. The siloxane oligomer may include both of an epoxy group and an acryl group. In an exemplary embodiment of the present invention, using both of the radical type initiator and the cationic type initiator may effectively progress a cross-linking reaction of the siloxane oligomer.

As an example, the solvent may include a ketone solvent or an ether solvent. The ketone solvent may include methylethyl ketone, acetophenone, cyclopentanone, ethyl isopropyl ketone, 2-hexanone, isophorone, mesityl oxide, methyl isobutyl ketone, 3-methyl-2-pentanone, 2-pentanone, or 3-pentanone. The ether solvent may include cyclopentyl methyl ether, diethylene glycol diethyl ether, dimethoxymethane, methyl tert-butyl ether, 2-(2-methoxyethoxy) ethanol, or propylene glycol. These may each be used alone or in a combination thereof.

The hard coating composition may be cured, for example, by UV light to form a hard coating layer. An indentation hardness of the hard coating layer may be at least 50 MPa. For example, the indentation hardness of the hard coating layer may be at least 70 MPa. The hard coating layer having an indentation hardness of at least 70 MPa may have a desired resistance against external scuffing without additional anti-abrasion treatment such as an anti-smudge layer. For example, an indentation hardness of the hard coating layer may be from about 70 MPa to about 95 MPa.

A tensile modulus of the hard coating layer may be 4.0 GPa or less. For example, the tensile modulus of the hard coating layer may be 3.7 GPa or less. When a tensile modulus of the hard coating layer is more than 3.7 GPa, flexibility of the hard coating layer may be reduced, thus reducing folding radius. For example, a tensile modulus of the hard coating layer may be from about 2 GPa to about 3.7 GPa.

As an example, the hard coating composition may include about 40% to about 70% by weight of the siloxane oligomer, about 5% to about 25% by weight of the epoxy cross-linker, about 1% to about 5% by weight of the polymerization initiator, and a remainder of the hard coating layer may be a solvent. When the polymerization initiator includes both of the radical type initiator and the cationic type initiator, a ratio of the radical type initiator and the cationic type initiator may be adjusted depending on a ratio of an epoxy group and an acryl group in the siloxane oligomer.

In an exemplary embodiment of the present invention, a hard coating composition may further include a repeating unit including fluorine.

As an example, the hard coating composition may include a siloxane oligomer, an epoxy cross-linker, a polymerization initiator and a remainder of the hard coating composition may be a solvent. The siloxane oligomer may be a silsesquioxane compound including repeating units represented by the following Chemical Formula 5.

<Chemical Formula 5>

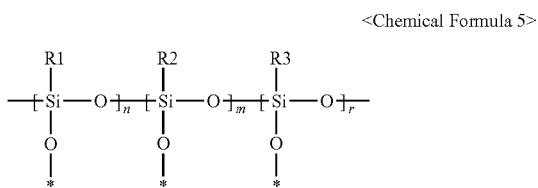

In Chemical Formula 5, an oxygen atom connected to * is connected to another Si atom in the siloxane oligomer, R1 represents an epoxy group or an alkyl group including an epoxy group, R2 represents a (meth)acryl group or an alkyl group containing a (meth)acryl group, R3 represents a fluoroaklyl group, in which at least one hydrogen atom is substituted with a fluorine atom, or a perfluoro polyether group, n, m and r independently represent a natural number, and a summation of n, m and r is 6 to 100.

For example, R1 may represent an alkyl group including an epoxy group and having a carbon number of 1 to 40, and R2 may represent an alkyl group, of which an end is combined with a (meth)acryl group, the alkyl group having a carbon number of 1 to 10. R3 may represent a fluoroaklyl group or a perfluoro polyether group, which has a carbon number of 5 to 200.

For example, R3 may be represented by the following Chemical Formula 6-1 or 6-2.

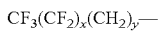            <Chemical Formula 6-1>

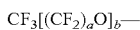            <Chemical Formula 6-1>

In Chemical Formula 6-1, x and y independently represent a natural number. For example, x and y may independently represent a natural number of 1 to 10.

In Chemical Formula 6-2, a and b independently represent a natural number. For example, a may represent a natural number 1 to 10, and b may represent a natural number of 10 to 50.

For example, R3 may be represented by the following Chemical Formula 6-3 or 6-4.

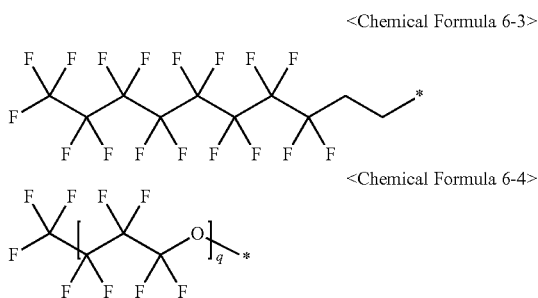

In Chemical Formula 6-4, q may represent a natural number of 10 to 50.

When the siloxane oligomer further includes a repeating unit including fluorine, a coating layer formed from the hard coating composition may have increased abrasion resistance and contamination resistance.

The hard coating composition may be provided on a polymer film, for example, including polyimide for forming a window of a display device. A hard coating layer formed from a siloxane oligomer might not have a hydroxyl group on a surface. According to an exemplary embodiment of the present invention, the repeating unit including fluorine is introduced into a siloxane oligomer. Thus, abrasion resistance and contamination resistance of a hard coating layer may be increased without including an additional anti-contamination layer or anti-abrasion coating layer.

As an example, the siloxane oligomer may be obtained by reaction of a silane compound including an epoxy group, a silane compound including an acryl group and a silane compound including a fluoroaklyl group. For example, the silane compound including an epoxy group, the silane compound including an acryl group and the silane compound including a fluoroaklyl group may react with each other in the presence of a basic catalyst such as $Ba(OH)_2 \cdot H_2O$ to form the siloxane oligomer. The molecular weight of the siloxane oligomer may be controlled by reaction time.

A content of the repeating unit including fluorine in the siloxane oligomer may be from about 5% to about 10% by weight based on a total weight of the siloxane oligomer. When a content of the repeating unit including fluorine is more than about 10% by weight, smear or haze on a surface of the hard coating layer may be increased, and resistance against external scuffing may be reduced. When a content of the repeating unit including fluorine is less than about 5% by weight, abrasion resistance or contamination resistance of the hard coating layer may be reduced.

In an exemplary embodiment of the present invention, the hard coating composition may further include a silane compound including fluorine. For example, the hard coating composition may include a siloxane oligomer including an epoxy group and an acryl group, an epoxy cross-linker, a silane compound including fluorine, a polymerization initiator and a remainder of the hard coating composition may be a solvent.

The siloxane oligomer including an epoxy group and an acryl group may be the same as the siloxane oligomer represented by Chemical Formula 1. The silane compound including fluorine may be represented by the following Chemical Formula 7-1 or 7-2.

            <Chemical Formula 7-1>

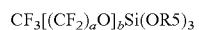            <Chemical Formula 7-2>

In Chemical Formula 7-1, x and y independently represent a natural number, and R4 represents an alkyl group. For example, x and y may independently represent a natural number of 1 to 10, and R4 may represent an alkyl group having a carbon number of 1 to 5.

In Chemical Formula 7-2, a and b independently represent a natural number and R5 represents an alkyl group. For example, a may represent a natural number of 1 to 10, b may represent a natural number of 10 to 50, R5 may represent an alkyl group having a carbon number of 1 to 5.

As an example, a content of the silane compound including fluorine may be 7% by weight or less based on a total weight of the hard coating composition. When a content of the silane compound including fluorine is more than 7% by weight, smear or haze on a surface of the hard coating layer may be increased, and resistance against external scuffing may be reduced. When a content of the silane compound including fluorine is less than 5% by weight, abrasion resistance or contamination resistance of the hard coating layer may be reduced.

Flexible Display Device

Figure 2:
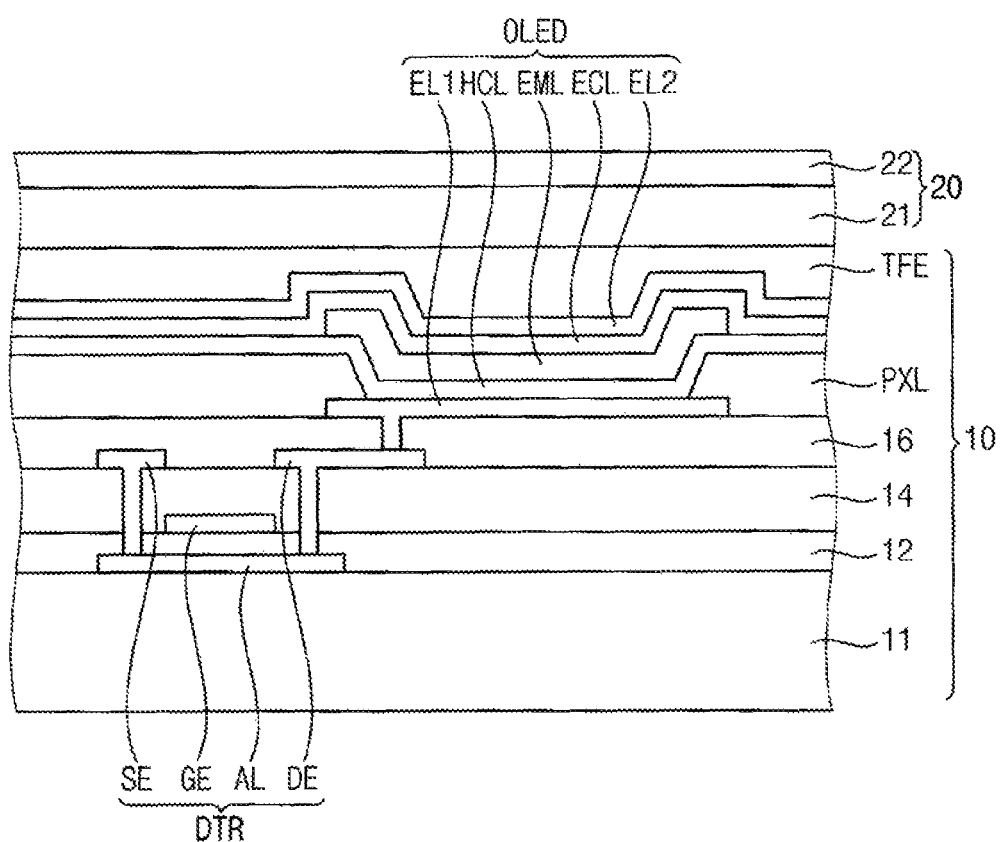
FIG. 2 is an enlarged cross-sectional view illustrating the flexible display device of FIG. 1.

FIG. 1 is a cross-sectional view illustrating a flexible display device according to an exemplary embodiment of the present invention. FIG. 2 is an enlarged cross-sectional view illustrating the flexible display device of FIG. 1. FIG.

3 is a cross-sectional view illustrating a flexible display device according to an exemplary embodiment of the present invention.

A flexible display device described with reference to FIG. 1 is in a state of being folded. The flexible display device may be a foldable display device that can be folded or unfolded by operation of a user.

Referring to FIGS. 1 and 2, the flexible display device may include a display panel 10 and a window member 20 disposed on a surface of the display panel 10. For example, the window member 20 may be combined with a display surface through which a light emitted by the display panel 10 passes.

The window member 20 may include a base film 21 and a hard coating layer 22. The base film 21 may be disposed between the display panel 10 and the hard coating layer 22.

The display panel 10 may be an organic light-emitting display panel including an organic light-emitting diode OLED. The display panel 10 may include a driving transistor DTR providing a current to the organic light-emitting diode OLED. The display panel 10 may include a plurality of transistors controlling the driving transistor DTR.

For example, the driving transistor DTR may include an active layer AL disposed on a base substrate 11, a gate electrode GE disposed on the active layer AL, a source electrode SE electrically connected to the active layer AL, and a drain electrode DE electrically connected to the active layer AL and spaced apart from the source electrode SE.

The base substrate 11 may include a plastic material, and thus the base substrate 11 may have flexibility. For example, the base substrate 11 may include polymethylmethacrylate, cellulose acetate, polyimide, polycarbonate, polyethylene terephthalate, polyethylene naphthalate, polystyrene, polypropylene, polyethylene, polysulfonate, polyvinyl alcohol, or polyvinyl chloride.

The active layer AL may include a semiconductive material, which may function as a channel of a switching element. For example, the active layer AL may include amorphous silicon, polysilicon, or an oxide semiconductor. In an exemplary embodiment of the present invention, the active layer AL may include polysilicon. A portion of the active layer AL, which overlaps the gate electrode GE, may be defined as a channel region. A portion of the active layer AL, which is in direct contact with the source electrode SE, may be defined as a source region. A portion of the active layer AL, which is in direct contact with the drain electrode DE, may be defined as a drain region. The source region and the drain region may be doped with impurities to have an electric conductivity larger than the channel area.

A first insulation layer 12 may be disposed between the active layer AL and the gate electrode GE. For example, the first insulation layer 12 may include an insulation material such as silicon nitride, silicon oxide, silicon oxynitride, or silicon carbide. The first insulation layer 12 may have a single layer structure or a multiple layer structure.

The gate electrode GE may be disposed on the first insulation layer 2, and may be substantially covered by a second insulation layer 14. The second insulation layer 14 may include an insulation material such as silicon nitride, silicon oxide, silicon oxynitride, or silicon carbide or the like. The second insulation layer 14 may have a single layer structure or a multiple layer structure.

The source electrode SE and the drain electrode DE may be disposed on the second insulation layer 14. The source electrode SE and the drain electrode DE may respectively pass through the first insulation layer 12 and the second insulation layer 14 to contact the active layer AL.

A third insulation layer 16 may be disposed on the source electrode SE and the drain electrode DE. The third insulation layer 16 may include an inorganic insulation material such as silicon nitride, silicon oxide, silicon oxynitride, or silicon carbide. The third insulation layer 16 may include an organic insulation material such as a phenol resin, or an acryl resin.

The display panel 10 may further include additional insulation layers.

The organic light-emitting diode OLED may include a first electrode EL1, a hole control layer HCL, an organic light-emitting layer EML, an electron control layer ECL and a second electrode EL2.

The first electrode EL1 may be disposed on the third insulation layer 16, and may function as an anode.

A pixel-defining layer PXL having an opening may be disposed on the third insulation layer 16. The pixel-defining layer PXL may partially cover the first electrode EL1, and an upper surface of the first electrode EL1 may be exposed through the opening of the pixel-defining layer PXL.

The hole control layer HCL may be disposed on the first electrode EL1 exposed through the opening. The hole control layer CL may include at least one of a hole transporting layer or a hole injection layer.

The organic light-emitting layer EML may be disposed on the hole control layer HCL and may overlap the opening of the pixel-defining layer PXL.

The electron control layer ECL may be disposed on the organic light-emitting layer EML, and may include at least one of an electron transporting layer and an electron injection layer.

The second electrode EL2 may be disposed on the electron control layer ECL, and may function as a cathode.

A thin film encapsulation layer TFE may be disposed on the second electrode EL2 and may encapsulate the organic light-emitting diode OLED. The thin film encapsulation layer TFE may protect the organic light-emitting diode OLED from humidity and/or impurities. The thin film encapsulation layer TFE may include at least two inorganic thin films and an organic thin film disposed between the inorganic thin films. For example, the thin film encapsulation layer TFE may include a plurality of inorganic thin films and a plurality of organic thin films alternately deposited with the inorganic thin films.

In an exemplary embodiment of the present invention, the base film 21 of the window member 20 may be disposed on the thin film encapsulation layer TFE.

The base film 21 may include a polymer. For example, the base film 21 may include polyimide, polyamide, polymethyl (meth)acrylate, polycarbonate, polyethylene, polypropylene, or polyethylene terephthalate. In an exemplary embodiment of the present invention, the base film 21 may include polyimide.

For example, the base film 21 may have a thickness of from about 30 μm to about 100 μm.

For example, the hard coating layer 22 may have a thickness of from about 10 μm to about 50 μm.

The hard coating layer 22 may be formed by using the hard coating composition according to an exemplary embodiment of the present invention. For example, the hard coating composition may be coated on the base film 21 through spin coating, slit coating, bar coating, or inkjet printing, and then dried to remove a solvent of the hard coating composition. A light, such as UV light, may be radiated onto the hard coating composition for curing to form a hard coating layer. Thus, the hard coating layer may include a cross-linked structure formed by a curing reaction of a silsesquioxane compound including a repeating unit represented by Chemical Formula 1.

Figure 3:
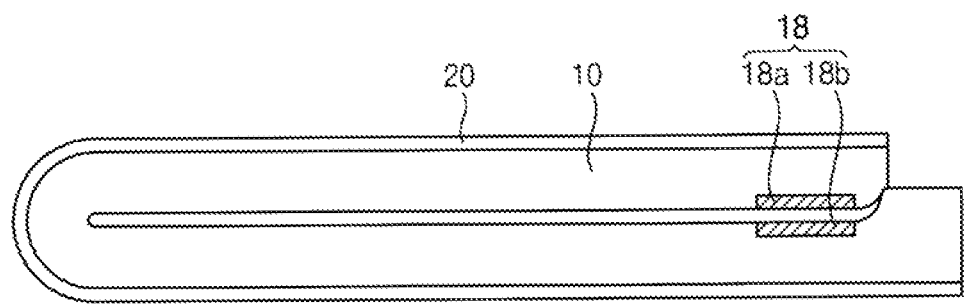
FIG. 3 is a cross-sectional view illustrating a flexible display device according to an exemplary embodiment of the present invention.

The hard coating composition described with reference to FIGS. 1-3 may be substantially the same as the hard coating composition according to an exemplary embodiment of the present invention described above. Thus, duplicative descriptions may be omitted.

Referring to FIG. 1, in a folding flexible display device, the window member 20 substantially covering the display surface of the display panel 10 may be disposed outside a folded portion of the flexible display panel when the flexible display panel is in a folded state. Thus, in the flexible display device in which the window member 20 faces away from a folding area of the display device, the window member 20 may be exposed to external impact or abrasion more often than a flexible display device folded in a direction to position the window member 20 facing the folding area of the flexible display device. Thus, resistance against external impact and abrasion of the hard coating layer may be increased. In an exemplary embodiment of the present invention, the hard coating layer 22 may maintain flexibility of the window member 20, and may also have a relatively high hardness (e.g., resistance to indentation). Thus, the hard coating layer 22 may have a relatively high resistance against external scuffing. Thus, a relatively durable and reliable flexible display device including the window member 20 facing away from the folding area of the display device may be achieved.

The window member 20 might not include an additional surface treatment. However, the window member 20 may further include additional functional layer such as an anti-smudge layer, as desired.

The flexible display device may include a fixing member such that a folded shape of the flexible display device may be maintained. For example, referring to FIG. 3, the display panel 10 may include a fixing member 18 disposed adjacent to an edge of the display panel 10.

For example, the fixing member 18 may be positioned in at least two locations of a non-display surface, which is opposite to the display surface, of the display panel 10.

For example, the fixing member 18 may include a magnetic substance having magnetism, and may include a first fixing member 18a and a second fixing member 18b, which faces the first fixing member 18a when the display device is folded. The first fixing member 18a and the second fixing member 18b may have opposite polarities so that magnetic attraction is applied thereto.

For example, a first portion of the non-display surface of the display panel 10 may be in direct contact with a second portion of the non-display surface of the display panel 10 as a result of the magnetic attraction between the first fixing member 18a and the second fixing member 18b. While the first fixing member 18a and the second fixing member 18b may be spaced apart from each other (see, e.g., FIG. 3), exemplary embodiments of the present invention are not limited thereto, and the first fixing member 18a and the second fixing member 18b may be in direct contact with each other.

While the display panel 10 is an organic light-emitting display panel in an exemplary embodiment of the present invention, the display panel 10 may be various display devices such as a liquid crystal display panel, an electrophoresis display device, or an electrowetting display device.

Figure 4:
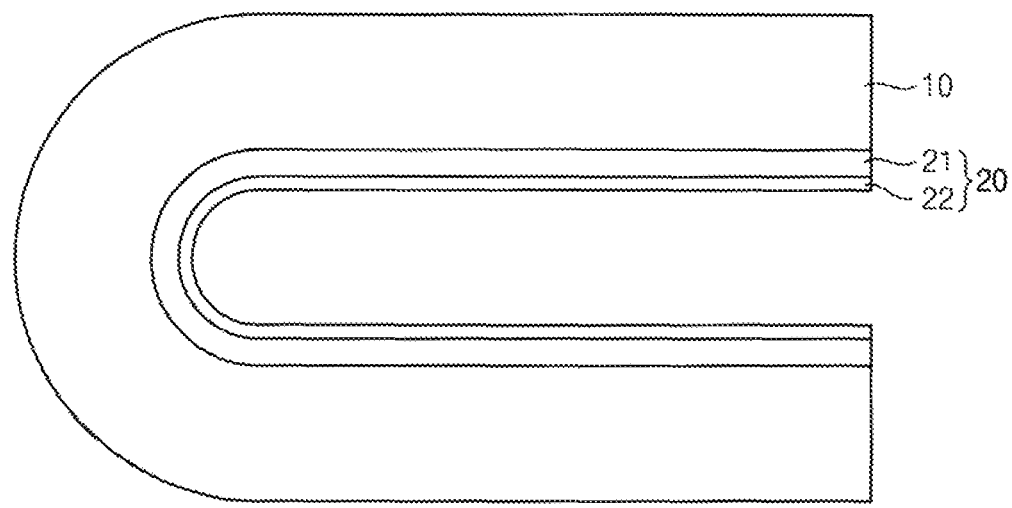
FIGS. 4, 5 and 6 are cross-sectional views illustrating flexible display devices according to some exemplary embodiments of the present invention.
Figure 5:
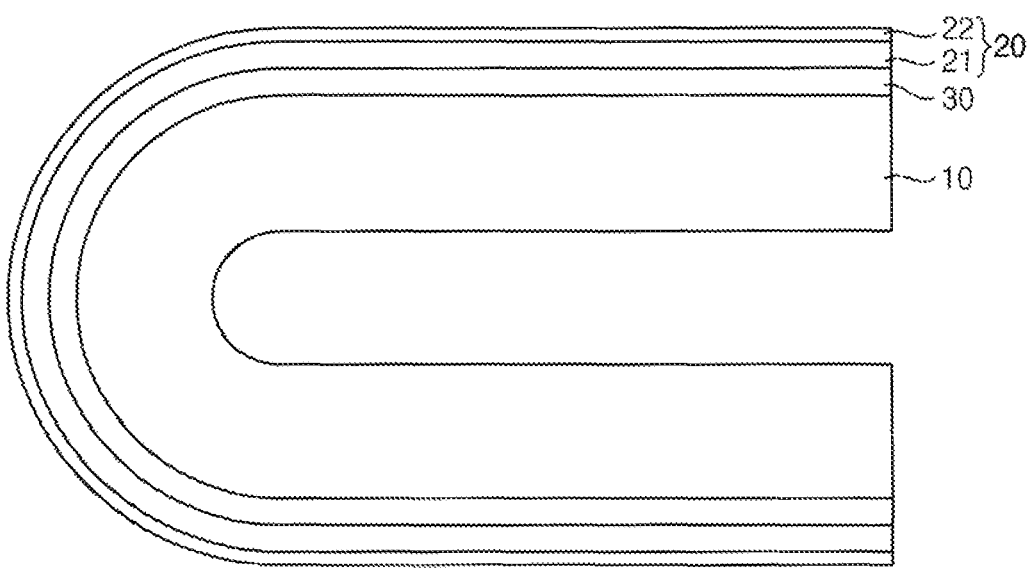
Figure 6:
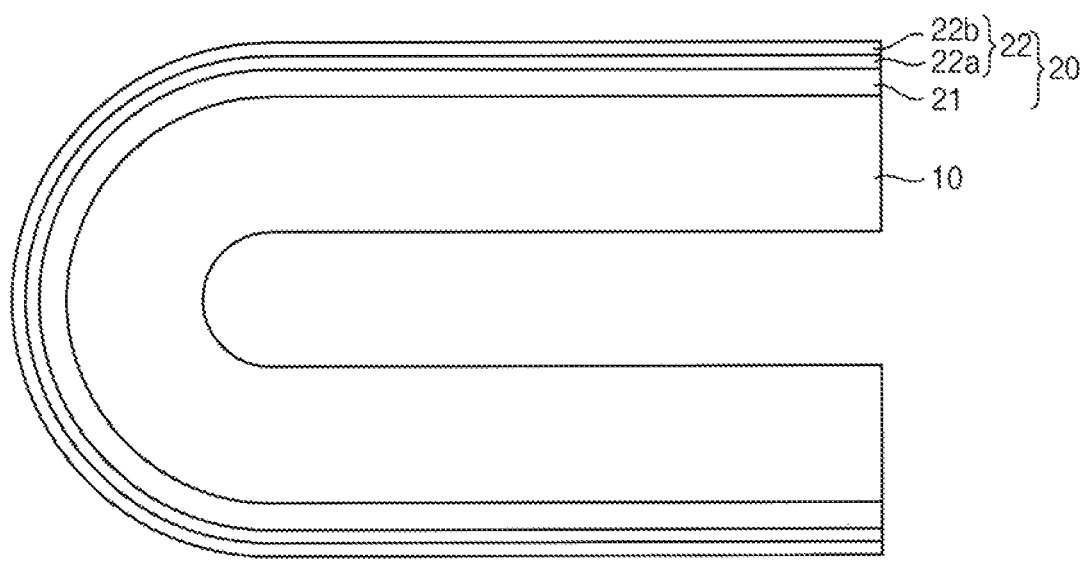
Figure 7:
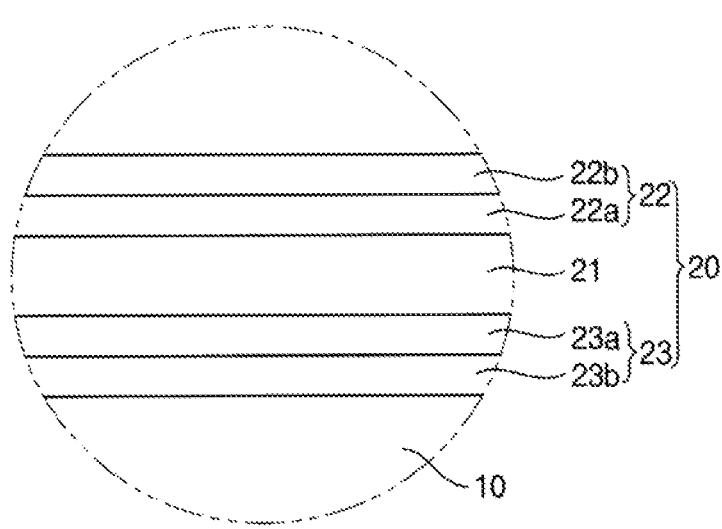
FIG. 7 is an enlarged cross-sectional view illustrating a window member of a flexible display device according to an exemplary embodiment of the present invention.

FIGS. 4, 5 and 6 are cross-sectional views illustrating flexible display devices according to some exemplary embodiments of the present invention. FIG. 7 is an enlarged cross-sectional view illustrating a window member of a flexible display device according to an exemplary embodiment of the present invention.

Referring to FIG. 4, a flexible display device may include the display panel 10 and the window member 20 connected with at least one surface of the display panel 10. The window member 20 may include the base film 21 and the hard coating layer 22. The base film 21 may be disposed between the display panel 10 and the hard coating layer 22.

The window member 20 described with reference to FIG. 4 may be substantially the same as the window member 20 described above with reference to FIG. 3, and thus duplicative descriptions may be omitted.

Referring to FIG. 5, a flexible display device may include the display panel 10 and the window member 20 connected with at least one surface of the display panel 10. The window member 20 may include the base film 21 and the hard coating layer 22. A touch screen 30 may be disposed between the display panel 10 and the window member 20.

Referring to FIG. 6, a flexible display device may include the display panel 10 and the window member 20 connected with at least one surface of the display panel 10. The window member 20 may include the base film 21 and the hard coating layer 22. The hard coating layer 22 may include the first hard coating layer 22a and the second hard coating layer 22b.

The first hard coating layer 22a and the second hard coating layer 22b may include different materials from each other. Thus, the first hard coating layer 22a and the second hard coating layer 22b may each have different properties capable of compensating for each other.

For example, the first hard coating layer 22a may include a cured material formed by reaction of an acryl siloxane oligomer and an acryl cross-linker. The second first hard coating layer 22b may include a cured material formed by reaction of an epoxy siloxane oligomer and an epoxy cross-linker.

For example, a first hard coating composition for forming the first hard coating layer 22a may include an acryl siloxane oligomer an acryl cross-linker, a polymerization initiator and a remainder of the hard coating layer may be a solvent.

For example, the acryl siloxane oligomer may be a silsesquioxane compound including a repeating unit represented by the following Chemical Formula 8.

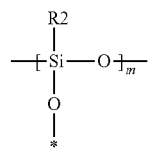
<Chemical Formula 8>

In Chemical Formula 8, an oxygen atom connected to * is connected to another Si atom in the siloxane oligomer, R2 represents a (meth)acryl group or an alkyl group including a (meth)acryl group, and m represents a natural number. For example, R2 may be an alkyl group, of which an end is combined with a (meth)acryl group, the alkyl group having a carbon number of 1 to 10. m may represent a natural number of 6 to 100.

For example, the acryl siloxane oligomer may be represented by the following Chemical Formula 8-1, and a number average molecular weight of the acryl siloxane oligomer may be from 5,000 to 10,000.

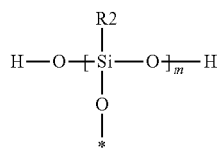

<Chemical Formula 8-1>

For example, the acryl cross-linker may include at least two (meth)acryl groups. For example, a bi-functional acryl cross-linker may include ethyleneglycol di(meth)acrylate, diethyleneglycol di(meth)acrylate, triethyleneglycol di(meth)acrylate, polyethyleneglycol di(meth)acrylate, 1,3-butyreneglycol di(meth)acrylate, 1,4-butandiol di(meth)acrylate, 1,6-hexanediol di(meth)acrylate, neopentylglycol di(meth)acrylate, propyleneglycol di(meth)acrylate, dipropyleneglycol di(meth)acrylate, tripropyleneglycol di(meth)acrylate, polypropyleneglycol di(meth)acrylate, 2-hydroxy-1,3-diacryloxypropane, 2,2-bis[4-(arcyloxypolymethoxy)phenyl] propane, 2,2-bis[4-(arcyloxypolyethoxy)phenyl]propane, bisphenol A bis(acryloyloxyethyl)ether, bisphenol A epoxy resin modified by (meth)acrylic acid, 3-methylpentanediol di(meth)acrylate, 2-hydroxy-3-acryloyloxypropyl methacrylate, or dimethylol tricyclodecane di(meth)acrylate. These may each be used alone or in a combination thereof.

For example, an acryl cross-linker having at least three reactive groups may include trimethylolpropane tri(meth)acrylate, pentaerithritol tri(meth)acrylate, pentaerithritol tetra(meth)acrylate, ditrimethylolpropane tetra(meth)acrylate, dipentaerythritol penta(meth)acrylate, dipentaerythritol hexa(meth)acrylate or the like. These may each be used alone or in a combination thereof.

For example, the polymerization initiator may include a radical type initiator, as described above in more detail.

As an example, the first hard coating composition may include about 40% to about 70% by weight of the acryl siloxane oligomer, about 5% to about 25% by weight of the acryl cross-linker, about 1% to about 5% by weight of the polymerization initiator and a remainder of the first hard coating composition may be a solvent.

For example, a second hard coating composition for forming the second hard coating layer 22b may include an epoxy siloxane oligomer, an epoxy cross-linker, a polymerization initiator and a remainder of the second hard coating composition may be a solvent.

For example, the epoxy siloxane oligomer may be a silsesquioxane compound including a repeating unit represented by the following Chemical Formula 9.

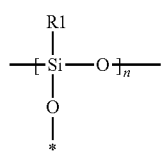

<Chemical Formula 9>

In Chemical Formula 9, an oxygen atom connected to * is connected to another Si atom in the siloxane oligomer, R1 represents an epoxy group or an alkyl group including an epoxy group, and n represents a natural number. For example, R1 may represent an alkyl group including an epoxy group and having a carbon number of 1 to 40, and n may represent a natural number of 6 to 100.

For example, the epoxy siloxane oligomer may be represented by the following Chemical Formula 9-1, and a number average molecular weight of the epoxy siloxane oligomer may be from 5,000 to 10,000.

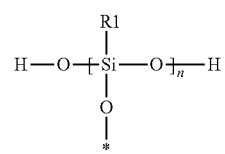

<Chemical Formula 9-1>

In an exemplary embodiment of the present invention, the epoxy siloxane oligomer may include a repeating unit including fluorine in addition to the repeating group including epoxy represented by Chemical Formula 1. For example, the epoxy siloxane oligomer may be a silsesquioxane compound including repeating units represented by the following Chemical Formula 10.

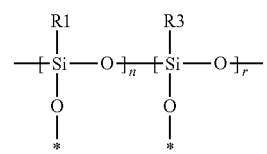

<Chemical Formula 10>

In Chemical Formula 10, an oxygen atom connected to * is connected to another Si atom in the siloxane oligomer, R1 represents an epoxy group or an alkyl group including an epoxy group, R3 represents a fluoroaklyl group, in which at least one hydrogen atom is substituted with a fluorine atom, or a perfluoro polyether group, and n and r independently represent a natural number. For example, R1 may represent an alkyl group including an epoxy group and having a carbon number of 1 to 40, R3 may represent a fluoroaklyl group or a perfluoro polyether group, which has a carbon number of 5 to 200, and summation of n and r may be 6 to 100.

A content of the repeating unit including fluorine in the siloxane oligomer may be, for example, from about 5% to about about 10% by weight of the siloxane oligomer.

The epoxy cross-linker, the polymerization initiator and the solvent may be substantially the same as those described above.

As an example, the second hard coating composition may include about 40% to about 70% by weight of the epoxy siloxane oligomer, about 5% to about 25% by weight of the epoxy cross-linker, about 1% to about 5% by weight of the polymerization initiator and a remainder of the second hard coating composition may be a solvent.

Thus, the first hard coating layer 22a may include a cross-linked structure formed by a curing reaction of the silsesquioxane compound including the repeating unit represented by Chemical Formula 8. The second hard coating layer 22b may include a cross-linked structure formed by a curing reaction of the silsesquioxane compound including the repeating unit represented by Chemical Formula 9.

The first hard coating layer 22a and the second hard coating layer 22b may have different properties from each other. For example, the first hard coating layer 22a, which includes a cross-linked structure of silsesquioxane connected by reaction of acryl groups, may have greater flexibility and tensile properties than the second hard coating layer 22b. Thus, the first hard coating layer 22a may reduce or prevent an occurrence of curling of the display panel and may control a folding angle of the display panel.

The second hard coating layer 22b, which includes a cross-linked structure of silsesquioxane connected by reaction of epoxy groups, may have a relatively high resistance against external impact and scratch.

Thus, the combination of the first hard coating layer 22a and the second hard coating layer 22b may compensate for each other to simultaneously reduce or prevent an occurrence of curling of the display panel and control a folding angle of the display panel, and to provide a relatively high resistance against external impact and scratch in a single coating layer 22.

The hard coating layer 22 including the hard coating layer 22a and the second hard coating layer 22b may be at least about 50 MPa. For example, the hard coating layer 22 including the hard coating layer 22a and the second hard coating layer 22b may be at least about 70 MPa. The hard coating layer having an indentation hardness of at least 70 MPa may have a desired resistance against external scuffing without additional anti-abrasion treatment such as an anti-smudge layer. For example, an indentation hardness of the hard coating layer may be from about 70 MPa to about 95 MPa.

A tensile modulus of the hard coating layer may be at most 3 GPa. When a tensile modulus of the hard coating layer is more than 3 GPa, flexibility of the hard coating layer may be reduced. For example, a tensile modulus of the hard coating layer may be from about 2 GPa to about 3 GPa.

A thickness ratio of the first hard coating layer 22a and the second hard coating layer 22b may be adjusted, which may modify the properties of the coating layer 22. For example, a thickness ratio of the first hard coating layer 22a and the second hard coating layer 22b may be from about 7:3 to about 3:7. When a thickness of the first hard coating layer 22a is larger than the above range, an indentation hardness of the hard coating layer may be reduced, thus reducing a resistance against external scuffing. When a thickness of the second hard coating layer 22b is larger than the above range, flexibility and stability against variation of a temperature and a humidity may be reduced.

A plurality of coating processes and curing processes may be performed to form the hard coating layer having a multiple layer structure. For example, the first hard coating composition may be coated on the base film 21 and then cured to form the first hard coating layer 22a. The second hard coating composition may be coated on the first hard coating layer 22a and then cured to form the second hard coating layer 22b. Thus, the hard coating layer having a multiple layer structure may be formed.

In an exemplary embodiment of the present invention, a window member may include coating layers combined with both surfaces of a base film. For example, referring to FIG. 7, the window member 20 may include the upper coating layer 22 disposed on a first surface of the window member 20 and externally exposed, and a lower coating layer 23 disposed on a second surface to face the display panel 10.

The upper coating layer 22 may include the first upper coating layer 22a and the second upper coating layer 22b. For example, the first upper coating layer 22a may include a cross-linked structure of silsesquioxane connected by reaction, of acryl groups, and may be disposed between the second upper coating layer 22b and the base film 21. The second upper coating layer 22b may include a cross-linked structure of silsesquioxane connected by reaction of epoxy groups.

The lower coating layer 23 may include a first lower coating layer 23a and a second lower coating layer 23b. For example, the first lower coating layer 23a may include a cross-linked structure of silsesquioxane connected by reaction of acryl groups, and may be disposed between the second lower coating layer 23b and the base film 21. The second lower coating layer 23b may include a cross-linked structure of silsesquioxane connected by reaction of epoxy groups.

According to an exemplary embodiment of the present invention, coating layers may be formed on opposite surfaces of the window member 20. Thus, the window member 20 may have two or more of the properties described herein, and the window member may implement a display device capable of folding in either of two opposing directions.

Exemplary coating compositions are described below.

Synthetic Example 1—Epoxy-Containing Siloxane Oligomer 0.1 mol of 2-(3,4-epoxycyclohexyl)ethyltrimethoxysilane was mixed with 2.7 g of water and put in a 100 ml flask. 0.05 ml of $Ba(OH)_2 \cdot H_2O$ was added thereto and stirred at a temperature of at least 60° C. for at least 6 hours to obtain a siloxane oligomer including an epoxy group.

Synthetic Example 2—Acryl-Containing Siloxane Oligomer 0.1 mol of methacryloxymethyltrimethoxysilane was mixed with 2.7 g of water and put in a 100 ml flask. 0.05 ml of Ba(OH)$_2$·H$_2$O was added thereto and stirred at a temperature of at least 60° C. for at least 6 hours to obtain a siloxane oligomer including an acryl group.

Synthetic Example 3—Epoxy-Acryl-Containing Siloxane Oligomer 2-(3,4-epoxycyclohexyl)ethyltrimethoxysilane and methacryloxymethyltrimethoxysilane were mixed with each other in a range of a mole ratio of 90:10 to 30:70. 0.1 mol of the mixture was mixed with 2.7 g of water and put in a 100 ml flask. 0.05 ml of Ba(OH)$_2$·H$_2$O was added thereto and stirred at a temperature of at least 60° C. for at least 6 hours to obtain a siloxane oligomer including an acryl group and an epoxy group.

Synthetic Example 4—Epoxy-Acryl-Containing Siloxane Oligomer 2-(3,4-epoxycyclohexyl)ethyltrimethoxysilane and methacryloxymethyltrimethoxysilane were mixed with each other with a mole ratio of 70:30, and 5% to 11% by weight of hetadecafluoro-1,1,2,2-tetrahydrodecyltrimethoxysilane was added thereto. 0.1 mol of the mixture was mixed with 2.7 g of water and put in a 100 ml flask. 0.05 ml of Ba(OH)$_2$·H$_2$O was added thereto and stirred at a temperature of at least 60° C. for at least 6 hours to obtain a siloxane oligomer including an acryl group, an epoxy group and a fluoroalkyl group.

The siloxane oligomer obtained by Synthetic Example 3 and (3,4-epoxycyclohexane)methyl 3,4-epoxycyclohexane carboxylate may be mixed with a weight ratio of 6:1 and stirred at about 60° C. for 1 hour. The temperature of the mixture may be cooled to a room temperature, and 25% by weight of methylethylketone and 5% by weight of a polymerization initiator including a mixture of aryl sulfonium hexafluoroantimonate and 2,4,6-trimethylbenzoyl phenylphosphine oxide may be added to obtain a coating composition.

The coating composition may be coated on a polyimide film with a thickness of about 10 μm and exposed to a UV lamp (1000 mJ/cm$^2$) to form a coating layer. A tensile modulus (GPa), an indentation hardness (MPa) and scuffing resistance of the coating layer may be measured and evaluated. Exemplary results are illustrated in the following Table 1. The scuffing resistance may be evaluated by observing scuff mark by impact by 1.5 kg with ten times using a steel wool measurer (O represents that no scuff mark was observed, and X represents that scuffmark was observed).

TABLE 1

|  | Ratio of epoxy and acryl | Tensile modulus (Gpa) | Indentation hardness (Mpa) | Scuffing resistance |
| --- | --- | --- | --- | --- |
| Example 1 | 30:70 | 2.7 | 50~55 | X |
| Example 2 | 40:60 | 2.7 | 55~60 | X |
| Example 3 | 50:50 | 2.8 | 60~70 | X |
| Example 4 | 60:40 | 3.0 | 70~80 | O |
| Example 5 | 70:30 | 3.2 | 80~90 | O |
| Example 6 | 80:20 | 3.7 | 90~95 | O |
| Example 7 | 90:10 | 3.9 | 93~97 | O |

The siloxane oligomer obtained by Synthetic Example 4 and (3,4-epoxycyclohexane)methyl 3,4-epoxycyclohexane carboxylate may be mixed with a weight ratio of 6:1 and stirred at 60° C. for 1 hour. The temperature of the mixture may be cooled to a room temperature, and 25% by weight of methylethylketone and 5% by weight of a polymerization initiator including a mixture of aryl sulfonium hexafluoroantimonate and 2,4,6-trimethylbenzoyl phenylphosphine oxide may be added to obtain a coating composition.

The coating composition may be coated on a polyimide film with a thickness of about 10 μm and exposed to a UV lamp (1000 mJ/cm$^2$) to form a coating layer. Exemplary measurements of smear appearance, haze appearance, abrasion resistance and scuffing resistance of the coating layer are illustrated in Table 2 below. The abrasion resistance may be evaluated by observing contact angle variation of water drop when worn by a steel wool measurer with 0.5 kg with 1,500 times (O represents variation less than 15 degrees).

TABLE 2

|  | monomer including fluorine (by weight) | Smear | Haze | Scuffing resistance | Abrasion resistance |
| --- | --- | --- | --- | --- | --- |
| Example 8 | 5% | none | none | O | O |
| Example 9 | 7% | none | none | O | O |
| Example 10 | 9% | none | none | O | O |
| Example 11 | 11% | appearance | appearance | X | O |

A mixture of the siloxane oligomer obtained by Synthetic Example 3 (epoxy:acryl=7:3) and hetadecafluoro-1,1,2,2,-tetrahydrodecyltrimethoxysilane may be mixed with (3,4-epoxycyclohexane)methyl 3,4-epoxycyclohexane carboxylate with a weight ratio of 6:1 and stirred at 60° C. for 1 hour. The temperature of the mixture may be cooled to a room temperature and 25% by weight of methylethylketone and 5% by weight of a polymerization initiator including a mixture of aryl sulfonium hexafluoroantimonate and 2,4,6-trimethylbenzoyl phenylphosphine oxide may be added to obtain a coating composition.

The coating composition may be coated on a polyimide film with a thickness of about 10 μm and exposed to a UV lamp (1000 mJ/cm$^3$) to form a coating layer. Exemplary measurements of smear appearance, haze appearance, abrasion resistance and scuffing resistance of the coating layer are illustrated in Table 3 below.

TABLE 3

|  | monomer including fluorine (by weight) | Smear | Haze | Scuffing resistance | Abrasion resistance |
| --- | --- | --- | --- | --- | --- |
| Example 12 | 5% | none | none | ○ | ○ |
| Example 13 | 7% | none | none | ○ | ○ |
| Example 14 | 9% | appearance | appearance | X | ○ |

The siloxane oligomer obtained by Synthetic Example 1 and (3,4-epoxycyclohexane)methyl 3,4-epoxycyclohexane carboxylate may be mixed with a weight ratio of 6:1 and stirred, at 60° C. for 1 hour. The temperature of the mixture may be cooled to a room temperature, and 25% by weight of methylethylketone and 5% by weight of a polymerization initiator including aryl sulfonium hexafluoroantimonate may be added to obtain an epoxy coating composition.

The siloxane oligomer obtained by Synthetic Example 2 and (3,4-epoxycyclohexane)methyl 3,4-epoxycyclohexane carboxylate may be mixed with a weight ratio of 6:1 and stirred at 60° C. for 1 hour. The temperature of the mixture may be cooled to a room temperature, and 25% by weight of methylethylketone and 5% by weight of a polymerization initiator including 2,4,6-trimethylbenzoyl phenylphosphine oxide may be added to obtain an acryl coating composition.

The acryl coating composition may be coated on a polyimide film and cured to form a first coating layer, and the epoxy coating composition may be coated on the first coating layer and cured to form a second coating layer such that a multiple layer including the first coating layer and the second coating layer had a total thickness of about 10 μm. Exemplary measurements of tensile modulus (GPa), an indentation hardness (MPa) and scuffing resistance of the coating layer are illustrated in Table 4 below.

TABLE 4

|  | Thickness ratio (first coating layer:second coating layer) | Tensile modulus (Gpa) | Indentation hardness (Mpa) | Scuffing resistance | Scuffing resistance with an anti-smudge layer |
| --- | --- | --- | --- | --- | --- |
| Example 15 | 2:8 | 2.3 | 45 | X | X |
| Example 16 | 3:7 | 2.5 | 52 | X | ○ |
| Example 17 | 4:6 | 2.6 | 55 | X | ○ |
| Example 18 | 5:5 | 2.7 | 60 | X | ○ |
| Example 19 | 6:4 | 2.8 | 70 | X | ○ |
| Example 20 | 7:3 | 3.0 | 75 | ○ | ○ |
| Example 21 | 8:2 | 3.7 | 80 | ○ | ○ |

Exemplary embodiments of the present invention may be used for increasing hardness of a film, such as a plastic film. For example, exemplary embodiments may be used for manufacturing a window cover of a display device such as a flexible display device.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
a display panel; and
a window member positioned on at least one surface of the display panel, wherein the window member includes a coating layer, the coating layer including a cross-linked structure of a silsesquioxane compound that includes an epoxy group and an acryl group and having an indentation hardness of about 50 MPa or more and a tensile modulus of about 4.0 GPa or less,
wherein the coating layer includes a cross-linked structure formed from a curing reaction of a silsesquioxane compound including repeating units represented by Chemical Formulas 1, wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, n and m independently represent a natural number, and a summation of n and m is from 6 to 100

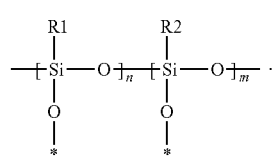

<Chemical Formula 1>

2. The display device of claim 1, wherein the window member further includes a base film disposed between the coating layer and the display panel.

3. The display device of claim 1, wherein a mole ratio of a first repeating unit, which is connected to R1, to a second repeating group, which is connected to R2, is 80:20 to 60:40.

4. A display device comprising:
a display panel; and
a window member positioned on at least one surface of the display panel, wherein the window member includes a coating layer, the coating layer including a cross-linked structure of a silsesquioxane compound that includes an epoxy group and an acryl group and having an indentation hardness of about 50 MPa or more and a tensile modulus of about 4.0 GPa or less, wherein the coating layer includes a cross-linked structure formed from a curing reaction of a silsesquioxane compound including repeating units represented by Chemical Formula 5, wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, R3 represents a fluoroalkyl group, in which at least one hydrogen atom is substituted with a fluorine atom, or a perfluoro polyether group, n, m and r independently represent a natural number, and a summation of n, m and r is from 6 to 100

<Chemical Formula 5>

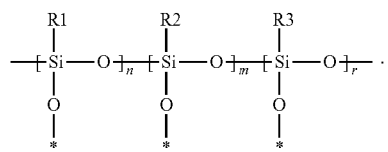

5. The display device of claim 4, wherein a content of a repeating unit including fluorine combined with R3 in the siloxane oligomer is from about 5% to about 10% by weight based on a total weight of the siloxane oligomer.

6. A display device comprising:
a display panel; and
a window member positioned on at least one surface of the display panel, wherein the window member includes a coating layer, the coating layer including a cross-linked structure of a silsesquioxane compound that includes an epoxy group and an acryl group and having an indentation hardness of about 50 MPa or more and a tensile modulus of about 4.0 GPa or less, wherein the coating layer includes a first coating layer and a second coating layer disposed on the first coating layer,
wherein the first coating layer includes a cross-linked structure formed from a curing reaction of a silsesquioxane compound including a repeating unit represented by Chemical Formula 8,
wherein the second coating layer includes a cross-linked structure formed from a curing reaction of a silsesquioxane compound including a repeating unit represented by Chemical Formula 9,
wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, and n and m independently represent a natural number <Chemical Formula 8>

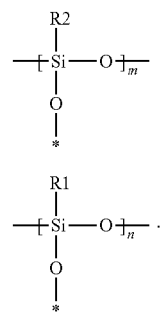

<Chemical Formula 9>

7. The display device of claim 6, wherein a thickness ratio of the first coating layer and the second coaling layer is from 7:3 to 3:7.

8. A display device comprising:
a display panel; and
a window member positioned on at least one surface of the display panel, wherein the window member includes a coating layer, the coating layer including a cross-linked structure of a silsesquioxane compound that includes an epoxy group and an acryl group and having an indentation hardness of about 50 MPa or more and a tensile modulus of about 4.0 GPa or less, wherein the window member further includes a base film, wherein the coating layer includes an upper coating layer disposed on a first surface of the base film, and a lower coating layer disposed on a second surface of the base film, wherein the upper coating layer includes a first upper coating layer combined with the base film and a second upper coating layer combined with the first upper coating layer, wherein the lower coating layer includes a first lower coating layer combined with the base film and a second lower coating layer combined with the first lower coating layer, and
wherein the first upper coating layer and the first lower coating layer include a cross-linked structure formed from a curing reaction of a silsesquioxane compound including a repeating unit represented by Chemical Formula 8,
wherein the second upper coating layer and the second lower coating layer include a cross-linked structure formed from a curing reaction of a silsesquioxane compound including a repeating unit represented by Chemical Formula 9, p1 wherein an oxygen atom connected to * is connected to another Si atom in the siloxane oligomer, R1 represents an epoxy group or an alkyl group including an epoxy group, R2 represents a (meth)acryl group or an alkyl group containing a (meth)acryl group, and n and m independently represent a natural number <Chemical Formula 8>

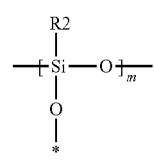

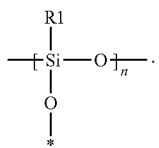
<Chemical Formula 9>

9. The display device of claim 1, wherein the display device is foldable.

10. The display device of claim 1, wherein the silsesquioxane compound has a tensile modulus of about 2.7-4.0 GPa.

11. The display device of claim 1, wherein the silsesquioxane compound comprises at least about 40% by weight of the coating layer.

12. A display device comprising;

a display panel; and a window member positioned on at least one surface of the display panel, wherein the window member includes a coating layer, the coating layer including a cross-linked structure of a silsesquioxane compound including repeating units having substituents, wherein each of the substituents independently includes an epoxy group or an acryl group.

13. The display device of claim 12, wherein the coating layer includes a cross-linked structure formed from a curing reaction of a silsesquioxane compound including repeating units represented by Chemical Formula 1, wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, n and m independently represent a natural number, and a summation of n and m is from 6 to 100

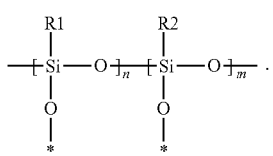
<Chemical Formula 1>

14. The display device of claim 12, wherein the coating layer includes a cross-linked structure formed from a curing reaction of a silsesquioxane compound including repeating units represented by Chemical Formula 5, wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, R3 represents a fluoroalkyl group, in which at least one hydrogen atom is substituted with a fluorine atom, or a perfluoro polyether group, n, m and r independently represent a natural number, and a summation of n, m and r is from 6 to 100

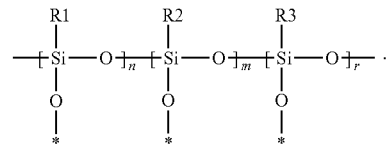
<Chemical Formula 5>

15. The display device of claim 12, wherein the coating layer includes a first coating layer and a second coating layer disposed on the first coating layer, wherein the first coating layer includes a cross-linked structure formed from a curing reaction of a silsesquioxane compound including a repeating unit represented by Chemical Formula 8, wherein the second coating layer includes a cross-linked structure formed from a curing reaction of a silsesquioxane compound including a repeating unit represented by Chemical Formula 9, wherein an oxygen atom connected to * is connected to an adjacent Si atom in the siloxane oligomer, R1 represents an epoxy group or an alkyl group including an epoxy group, R2 represents a (meth)acryl group or an alkyl group including a (meth)acryl group, and n and m independently represent a natural number

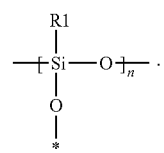
<Chemical Formula 8>

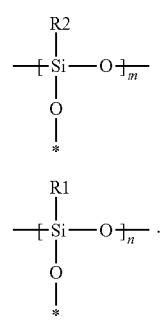
<Chemical Formula 9>

16. The display device of claim 12, wherein the window member further includes a base film, wherein the coating layer includes an upper coating layer disposed on a first surface of the base film, and a lower coating layer disposed on a second surface of the base film, wherein the upper coating layer includes a first upper coating layer combined with the base film and a second upper coating layer combined with the first upper coating layer, wherein the lower coating layer includes a first lower coating layer combined with the base film and a second lower coating layer combined with the first lower coating layer, and wherein the first upper coating layer and the first lower coating layer include a cross-linked structure formed from a curing reaction of a silsesquioxane compound including a repeating unit represented by Chemical Formula 8, wherein the second upper coating layer and the second lower coating layer include a cross-linked structure formed from a curing reaction of a silsesquioxane compound including a repeating unit represented by Chemical Formula 9, wherein an oxygen atom connected to * is connected to another Si atom in the siloxane oligomer, R1 represents an epoxy group or an alkyl group including an epoxy group, R2 represents a (meth)acryl group or an alkyl group containing a (meth)acryl group, and n and m independently represent a natural number
<Chemical Formula 8>
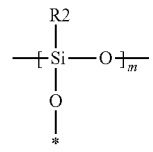
<Chemical Formula 9>
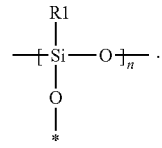
* * * * *